H. ST. YVES.
MOTOR CYCLE.
APPLICATION FILED FEB. 23, 1915.

1,164,122.                        Patented Dec. 14, 1915.

Witnesses:
A. R. Appleman
Robert F. Beyer

Henri St. Yves.
Inventor
By Henry Stanley Renaud
Attorney

UNITED STATES PATENT OFFICE.

HENRI ST. YVES, OF NEW YORK, N. Y.

MOTOR-CYCLE.

1,164,122.

Specification of Letters Patent.   Patented Dec. 14, 1915.

Application filed February 23, 1915.   Serial No. 9,997.

*To all whom it may concern:*

Be it known that I, HENRI ST. YVES, a citizen of the Republic of France, and a resident of New York, county and State of New York, have invented certain new and useful Improvements in Motor-Cycles, of which the following is a specification.

This invention has reference to improvements in motorcycles.

Figure 1:
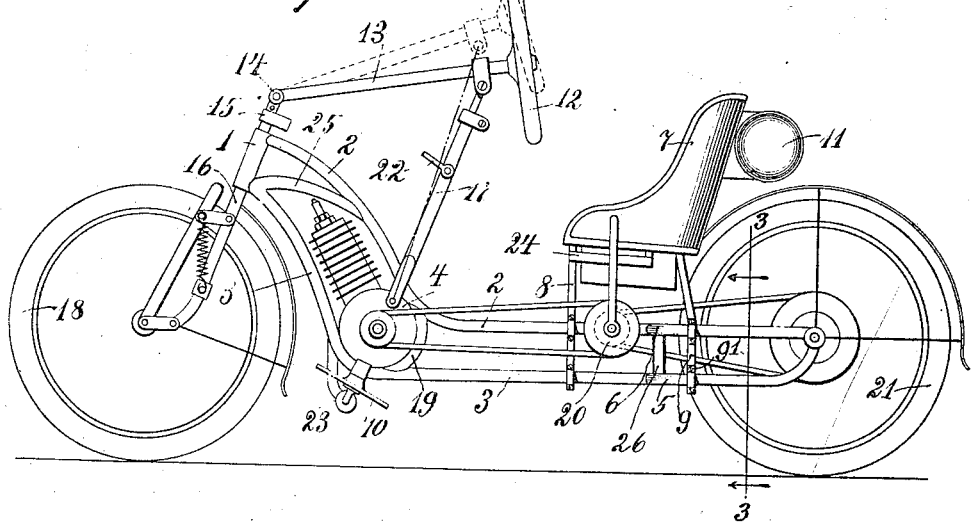
Figure 2:
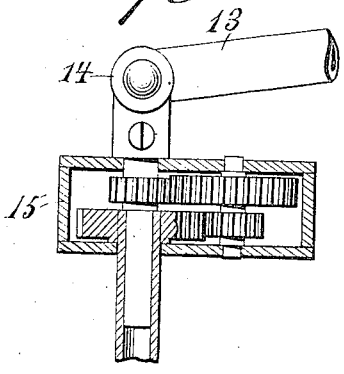
Figure 3:
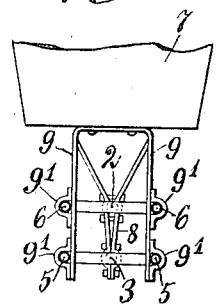

It pertains particularly to an entirely new type of motorcycle of an improved and special construction for the purpose of imparting comfort, safety and speed. To attain these desirable results, the frame is of unique construction. The seat supports have been improved with a view of attaining the highest comfort and rendering the seat also adjustable. Further, means are provided for reducing the movement of the steering device to permit of easy steering of the motorcycle, and care has been taken to produce a neat and attractive article, all as will be fully described hereinafter with reference to the accompanying drawing, in which:

Figure 1, represents in side elevation, a motorcycle embodying in desirable form the present improvements. Fig. 2, illustrates in sectional view, mechanism for reducing the movement of the steering device. Fig. 3, is a rear view seen from line 3—3 of Fig. 1.

Similar characters of reference denote like parts in all the figures.

In the drawing, in Fig. 1 the chassis or frame is of a construction especially designed to attain the convenience herein set forth. The frame is supplied with a fork head 1 to which are braced the two tubes 2 and 3. These tubes descend under a convenient angle and leave between them a space sufficient to receive the motor 4. The tubes are bent at the base parallel to the ground and continue parallel to each other and one above the other with a suitable space between for a certain length, when they are braced to two forks 5 and 6, which forks form the back end of the chassis or frame.

The described construction of the chassis or frame permits of the installation of a seat 7 which is constructed on the well known auto seat type. However, the seat is attached to the frame by the two supports 8 and 9 designed so as to permit of the adjustment of the seat on the frame for the convenience of the driver, that is to say nearer or farther from the foot rests 10 which are provided one on each side of the frame. This horizontal adjustment of the seat is effected by means of the improved seat support, as shown in detail in Fig. 3. The rear chair support 9 is provided with clips $9^1$ through which pass the forks 5 and 6 while the front support 8 is adapted to slide on the frame tubes 2 and 3.

On the rear of the seat 7, a tank 11 is attached which holds the gasolene and oil necessary for the operation of the motor. The steering of this motor is effected by means of a steering wheel 12 of the type ordinarily employed in automobiles. The steering wheel is attached to the steering post 13. At the end of said post opposite to the steering wheel there is a universal joint 14 which is attached to the small gear box 15. The mechanism within the box 15 consists of gearing whereby the movement of the steering wheel is reduced to a sufficient degree to permit of easy steering of the motorcycle by means of the deflection of the forks 16 of the front wheel 18. This wheel is deflected to the right and left as desired. The motion of the steering wheel is reduced to about 50% before acting on the front wheel, whereby a perfect and safe control of the motorcycle is assured.

The steering post or rod 13 is adjustable for length in order to accommodate the position of the wheel to the driver of the motorcycle. The steering post is supported on a sliding tube 17 which is adjustable to height and assures the stability of the steering wheel 12.

The motorcycle is furnished with a gasolene four-cycle motor 4, mounted in the frame between the tubes 2 and 3 and supported at the base by a tube 19 which assures the rigid attachment of the motor to the frame. The motor transmits its power to the clutch 20 by chains, whereby the speed of the motor may be reduced. By means of the said clutch the power is transmitted to the rear wheel 21. The clutch 20 serves for starting the motorcycle and for the regulation of the speed of the same. The speed of the motorcycle may also be regulated by the lever or throttle 22 which advances or retards the speed of the motor. A muffler 23 is provided and a spring 24 holds the clutch lever in position. For the purpose of strengthening the frame, bracing tubes 25 and 26 are attached thereto, as shown in Fig. 1.

I claim as my invention:

1. A motorcycle with a front and a rear wheel comprising a frame composed of two tubes in a vertical plane bent in the front downward and then rearward, a motor mounted in said bend, a fork braced to each rear end of a frame tube, an adjustable seat support formed of the said forks and adjoining portions of the frame tubes, a seat thereon, an adjustable steering device, and means for transmitting the power from the motor to the rear wheel.

2. A motorcycle with a front and a rear wheel comprising a frame composed of two tubes in a vertical plane bent in the front downward and rearward, a motor mounted in said bend, a fork braced to each rear end of a frame tube, a seat support formed of the said forks and adjoining portions of the frame, a seat thereon adapted to be horizontally adjusted, an adjustable steering device, and a clutch in connection with the motor and the rear wheel.

3. In a motorcycle, a frame forming a front fork, a head on said fork, two frame tubes braced to said head in a vertical plane and bent downward and rearward forming a support for the motor in said bend, and a fork braced to each rear end of a frame tube, said forks and adjoining portions of the frame tubes forming a seat support.

4. In a motorcycle, a frame composed of two vertical tubes, a fork braced to the rear end of each of said frame tubes, a rear seat support on both branches of said forks, clips thereon adapted to move on the branches of said forks, and a front seat support adapted to slide on the adjoining portions of the two frame tubes.

Signed at New York, N. Y., this 19th day of February 1915.

HENRI ST. YVES.

Witnesses:
CATHERINE PARMIGIANI,
ROBERT P. BEYER.